May 6, 1969 P. J. F. PASCAUD 3,442,263

ELECTRONIC HEART-TROUBLE WARNING DEVICE

Filed June 4, 1964

Pierre Jean Fernand Pascaud
Inventor

By Wenderoth, Lind & Ponack, Attorneys

United States Patent Office 3,442,263

Patented May 6, 1969

3,442,263
ELECTRONIC HEART-TROUBLE WARNING DEVICE

Pierre Jean Fernand Pascaud, 17 Rue Armengaud, Saint-Cloud, Hauts-de-Seine, France Filed June 4, 1964, Ser. No. 372,631
Claims priority, application France, June 17, 1963, 938,335
Int. Cl. A61b 5/02
U.S. Cl. 128—2.05 4 Claims

ABSTRACT OF THE DISCLOSURE

An electronic device comprising a portable apparatus including responsive means applied to a region of the body of the user where pulsations of the arterial pressure are perceptible. The responsive means can be, for example, in the form of a bracelet bearing against the cubital artery, a branch of spectacles bearing against the temporal artery. The responsive means are connected to an electronic unit which emits a warning signal when the rhythm of the pulsations reaches a dangerous zone and constitutes a sign of possible heart attack. The responsive means comprises a magnetic circuit which induces current in a coil by modifying its air gap by means of a lever applied against the skin of the user.

The invention relates to an electronic device comprising a portable apparatus including responsive means responsive to the pulsations of arterial pressure (pulse), or directly to the beats of the heart, and an electronic device emitting a warning signal when the rhythm of the pulsations reaches a dangerous zone and constitutes a sign of a possible heart attack. Such a warning device warns the user of the imminence of a failure which could be dangerous to his health and makes him stop whatever he is doing (for example, the practice of a sport, overworking, or driving a motor vehicle) or makes him immediately consult a doctor.

Such a device could be of great help to motorists liable to heart trouble who, if warned of the imminence of the failure, could stop driving and remain stationary before this failure, which is often the cause of serious accidents.

The portable apparatus comprises a support carried by the user in the region of his body where a pulse is perceptible and can be, for example, in the form of a bracelet bearing against the cubital artery, a branch of spectacles bearing against the temporal artery, or a harness bearing against the precordial region. The electronic device, connected to the responsive means by a connecting wire, and its power supply unit can be carried by the user in, for example, a pocket or, in the case of a motorist, they can be carried by the vehicle.

Further features and advantages of the invention will be apparent from the ensuing description with reference to the accompanying drawings to which the invention is in no way limited.

Figure 1:
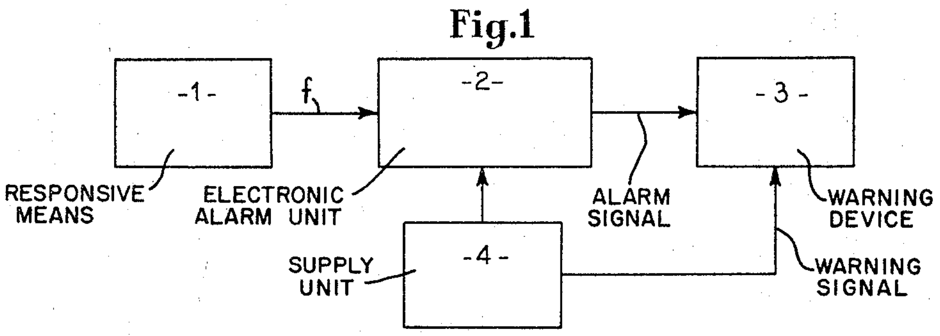
FIG. 1 is a block diagram of the invention.

With reference to the block diagram shown in FIG. 1, the device according to the invention comprises:

(1) Responsive means 1 whose feeler is actuated by each of the pulsations of the blood, the pulsations being emitted at a substantially constant recurrence frequency $f$ of the order of 1–2 Hz.; this responsive means transforms these pulsations into variations in an electrical magnitude of current or voltage having the same frequency $f$.

(2) An electronic unit 2 connected to this responsive means which receives these variations in an electrical magnitude and emits an alarm signal when the frequency $f$ exceeds a limit signal F which is determined in such manner that the fact of exceeding this value is an indication of a pathological state liable to cause a heart attack.

(3) A warning device 3 which, when it is actuated by the alarm signal emits a warning signal perceptible by a human sense, for example a sound or light signal.

(4) A supply unit 4 connected to the electronic unit and to the warning device so as to supply the latter with suitable power, this supply unit comprising, for example, its own source of electrical power, such as a battery, or means for connecting this unit to an outside source and in particular the electric circuit of a motor vehicle.

The various parts of the device according to the invention can be constructed in various ways.

Regardless of the way in which these parts are constructed, the responsive means can be constructed in the form of a light unit of small size so arranged as to be incorporated in a portable apparatus which maintains the feeler of the responsive means in contact with a region of the surface of the human body in which is externally perceptible the pulse of a pulsating organ such as the heart, an artery or arteriole.

The other part of the device (electronic unit, warning device, supply unit) generally have a weight and volume much greater than those of the responsive means. These parts, or some thereof, can be disposed outside the portable apparatus and constitute one or several units carried by the user or by an outside support. For example, the supply unit can be formed by a portable dry battery or, in the case of an apparatus intended for a motorist, by the battery of the vehicle. The generating set can be incorporated either in the portable apparatus or in the supply unit. The alarm apparatus can be carried by the portable apparatus or by a fixed support.

Figure 2:
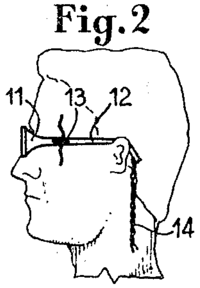
FIGS. 2, 3 and 4 are outside views of examples of a portable apparatus forming part of the invention.

In the first embodiment of the invention shown in FIG. 2, the portable apparatus is in the form of a spectacles chassis 11 in one of the branches of which, 12, is disposed the responsive means 13 whose feeler is applied against the region of the temple of the user in which the pulsations of the temporal arteriole are perceptible. This responsive means is connected by a flexible cable 14 to an assembly (not shown) which comprises the electronic alarm unit 2 the warning device 3 and the supply unit 4 and is carried by the user in the case of a self-contained apparatus or by the vehicle in the case of a motorist.

In the case of extremely small or miniature circuits, the electronic unit could also be carried by the spectacles chassis and connected by a flexible cable to the source of power.

Figure 3:
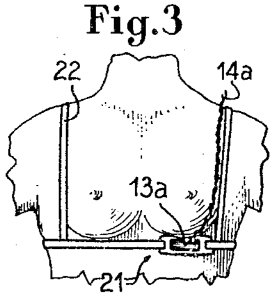

In the second embodiment shown in FIG. 3, the portable apparatus 21 is in the form of a harness which can be incorporated in underclothing and includes a belt carried by braces 22 and maintaining the feeler of a responsive means 13*a* applied against the left part of the thorax in the precordial region. As in the preceding embodiment, the electronic alarm unit 2 and the warning device 3 can be combined with the responsive means 1 or with the supply unit 4, a flexible cable 14*a* connects the responsive means to these circuits.

Figure 4:
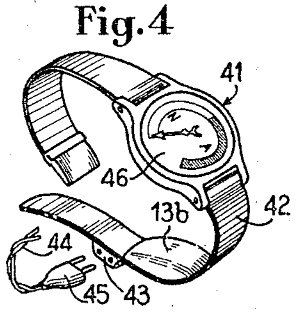

In the third embodiment of the invention (FIG. 4), the portable apparatus 41 is in the form of a wrist-watch comprising a bracelet 42 holding the feeler of a responsive means 13*b* against a region of the wrist in which is perceptible the pulse of the cubital artery. This apparatus has a socket 42 for connecting a plug 45 of a connecting cable 44. In this case, as in the foregoing embodiments, the warning device 3 can be an outside device, but it can also be in the form of a galvanometer 46 having the appearance of a watch, the warning signal being materialized by variation in the position of the needle or pointer of the galvanometer.

It must be understood that the invention is not intended to be limited by these types of portable apparatus. The form which the invention takes will be determined by the rule that the responsive means must be placed, whenever possible, in a region where there occurs, in the course of the normal activity of the user, the minimum amount of muscular contractions whose action is capable of creating parasitic signals in the responsive means.

Figure 5:
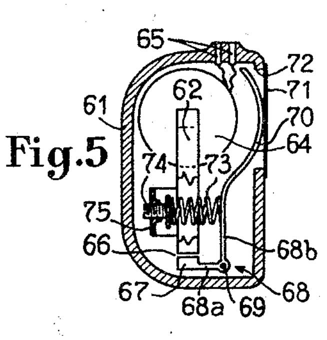
FIG. 5 is a diagrammatic sectional view of a magnetic responsive means shown in FIGS. 2, 3 and 4.
Figure 6:
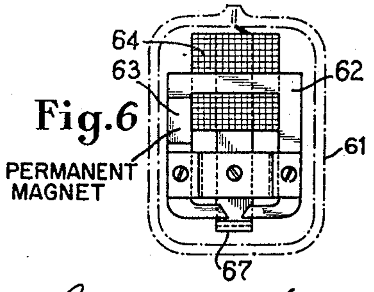
FIG. 6 is an elevational view of this responsive means taken at 90° to FIG. 5, the coil having been partly cut away.

The responsive means 1 can be constructed in the form shown in FIGS. 5 and 6. It comprises, disposed in a case 61—whose shape and size can vary in accordance with the region in which this responsive means is used—a magnetic circuit 62 which is fixed relative to the case and comprises a permanent magnet 63. A coil 64 whose ends are connected to electric sockets or pins 65, is wound around the magnetic circuit 62. This magnetic circuit has an airgap 66 which is closed to a variable extent by a moving armature 67 mounted on an arm 68*a* of a cranked lever 68 which is pivotally mounted at 69, the outer arm 68*b* of the lever being connected to a blade or pad 70 forming a feeler which, when the apparatus is in position on the user, bears against a flexible membrane 71 closing an opening 72 in the case. A pressure-regulating device is provided and comprises a spring 73 which bears, at one end, against the feeler and, at its other end, against an adjusting screw screwed into a support 75 fixed relative to the case.

The assembly of this responsive means can be in the form of a small unit; for example the overall dimensions of this responsive means could be of the order of 18 mm. x 8 mm. x 10 mm.

Regardless of the form of the responsive means employed, when the moving element (feeler) of the latter is shifted by the pulsations, it varies the magnetic flux through the coil and thus produces in the latter an electromotive force which reproduces the movements undergone by the feeler. Thus there is obtained at the terminals 65 a series of voltage pulses whose recurrence frequency is equal to the frequency $f$ of the pulsations.

The circuits of FIG. 1 can all be constructed in accordance with assemblies known in the electronic art. Therefore it is not necessary to describe them more fully herein.

Although specific embodiments of the invention have been described, many modifications and changes may be made therein without departing from the scope of the invention as defined in the appended claims.

Having now described my invention what I claim as new and desire to secure by Letters Patent is:

1. In a warning device for giving a warning of heart trouble of the user of the device, said device comprising an electronic unit for transforming oscillations of variable frequency, responsive means providing said oscillations and comprising a case a part of which consists of a flexible membrane for placing in direct physical contact with a part of the user in which the pulse of the arterial pressure of the user can be felt so as to be depressed to a variable extent by said pulse, an electromagnetic transducer mounted in said case, said transducer comprising a coil, a magnetic circuit combined with said coil to create current in said coil, said magnetic circuit having an air gap, an element which includes a metal closing member and is mounted in said case to be movable in a direction to cause said closing member to close said gap to a variable extent, elastic means biasing said element in a direction outward of said case against said membrane, said warning device being combined with spectacles having two branches for engaging the ears of the user, one of said branches carrying said responsive means for holding the latter against the temporal artery of the user.

2. In a warning device for giving a warning of heart trouble of the user of the device, said device comprising an electronic unit for transforming oscillations of variable frequency, responsive means providing said oscillations and comprising a case a part of which consists of a flexible membrane for placing in direct physical contact with a part of the user in which the pulse of the arterial pressure of the user can be felt so as to be depressed to a variable extent by said pulse, an electromagnetic transducer mounted in said case, said transducer comprising a coil, a magnetic circuit combined with said coil to create current in said coil, said magnetic circuit having an air gap, an element which includes a metal closing member and is mounted in said case to be movable in a direction to cause said closing member to close said gap to a variable extent, and elastic means biasing said element in a direction outward of said case against said membrane, said warning device being combined with a harness which is adapted to be worn on the thorax of the user and carries said responsive means, so as to hold said responsive means against the precordial region of the user.

3. In a warning device for giving a warning of heart trouble of the user of the device, said device comprising an electronic unit for transforming oscillations of variable frequency, responsive means providing said oscillations and comprising a case a part of which consists of a flexible membrane for placing in direct physical contact with a part of the user in which the pulse of the arterial pressure of the user can be felt so as to be depressed to a variable extent by said pulse, an electromagnetic transducer mounted in said case, said transducer comprising a coil, a magnetic circuit combined with said coil to create current in said coil, said magnetic circuit having an air gap, an element which includes a metal closing member and is mounted in said case to be movable in a direction to cause said closing member to close said gap to a variable extent, and elastic means biasing said element in a direction outward of said case against said membrane, said warning device being combined with a bracelet adapted to be carried on the wrist of the user and carrying said responsive means so as to hold the responsive means against the cubital artery of the user, said electronic unit including a galvanometer which is carried by the bracelet having a needle for giving said signal.

4. In a warning device for giving a warning of heart trouble of the user of the device, said device comprising an electronic unit for transforming oscillations of variable frequency, responsive means providing said oscillations and comprising a case a part of which consists of a flexible membrane for placing in direct physical contact with a part of the user in which the pulse of the arterial pressure of the user can be felt so as to be depressed to a variable extent by said pulse, an electromagnetic transducer mounted in said case, said transducer comprising a coil, a magnetic circuit combined with said coil to create current in said coil, said magnetic circuit having an air gap, an element which includes a metal closing member and is mounted in said case to be movable in a direction to cause said closing member to close said gap to a variable extent, elastic means biasing said element in a direction outward of said case against said membrane, said element being a lever pivotally mounted on said case at a pivot point intermediate the ends of said lever, said closing member being an armature mounted on one end of said lever and the other end of said lever being biased against said membrane by said elastic means.

References Cited

UNITED STATES PATENTS

| | | | |
|---|---|---|---|
| 2,836,173 | 5/1958 | Vemura et al. | 128—2.05 |
| 3,171,406 | 3/1965 | Baum et al. | 128—2.05 |
| 2,829,637 | 4/1958 | McCormick | 128—2.05 |
| 2,848,992 | 8/1958 | Pigeon | 128—2.05 |
| 3,002,185 | 9/1961 | Bases | 128—2.05 X |
| 3,156,235 | 11/1964 | Jaeger | 128—2.05 X |

RICHARD A. GAUDET, *Primary Examiner.*

MARTIN F. MAJESTIC, *Assistant Examiner.*